United States Patent
Wang et al.

(10) Patent No.: US 9,077,446 B2
(45) Date of Patent: Jul. 7, 2015

(54) METHOD FOR CONTROLLING RANDOM ACCESS FOR THE EFFICIENT SENSING OF THE COOPERATIVE SPECTRUM IN A COGNITIVE RADIO-BASED FREQUENCY RESOURCE SHARING SYSTEM

(75) Inventors: Hanho Wang, Seoul (KR); Gosan Noh, Seoul (KR); Daesik Hong, Seoul (KR); Junho Jo, Anyang-si (KR); Jihyun Lee, Anyang-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 298 days.

(21) Appl. No.: 13/702,955

(22) PCT Filed: Jan. 21, 2011

(86) PCT No.: PCT/KR2011/000453
§ 371 (c)(1),
(2), (4) Date: Dec. 7, 2012

(87) PCT Pub. No.: WO2011/155682
PCT Pub. Date: Dec. 15, 2011

(65) Prior Publication Data
US 2013/0090145 A1    Apr. 11, 2013

Related U.S. Application Data

(60) Provisional application No. 61/352,830, filed on Jun. 9, 2010.

(51) Int. Cl.
*H04B 17/00* (2006.01)
*H04W 74/08* (2009.01)
*H04B 17/391* (2015.01)

(52) U.S. Cl.
CPC ....... *H04B 17/0097* (2013.01); *H04W 74/0816* (2013.01); *H04B 17/3913* (2015.01)

(58) Field of Classification Search
CPC .................................................. H04B 17/0097
USPC ........................................................ 455/509
See application file for complete search history.

(56) References Cited

U.S. PATENT DOCUMENTS

2007/0115878 A1    5/2007   Ashish et al.
2011/0228693 A1*   9/2011   Larsson et al. ................ 370/252

(Continued)

FOREIGN PATENT DOCUMENTS

KR    10-2007-0048555 A    5/2007
KR    10-2009-0052547 A    5/2009

(Continued)

*Primary Examiner* — Bobbak Safaipour
(74) *Attorney, Agent, or Firm* — Ladas & Parry, LLP

(57) ABSTRACT

An embodiment of the present invention relates to a method for performing spectrum sensing to detect a signal for a terminal of a primary user in each sensing node. The method for performing sensing may comprise the steps of: performing, by the sensing node, spectrum sensing to detect a signal for a terminal of a primary user; computing, by the sensing node, a local test statistic on the basis of the result of the spectrum sensing; calculating, by the sensing node, the transmission probability on the basis of the computed local test statistic; and transmitting, by the sensing node, sensing information to a convergence center on the basis of the calculated transmission probability. In this case, the convergence center can determine whether the signal for a primary user exists on the basis of the transmitted sensing information.

10 Claims, 11 Drawing Sheets

(56) References Cited

U.S. PATENT DOCUMENTS

2012/0163355 A1* 6/2012 Heo et al. ............ 370/338
2012/0289236 A1* 11/2012 Xu et al. ............ 455/446

FOREIGN PATENT DOCUMENTS

| KR | 10-2009-0083783 A | 8/2009 |
| KR | 10-2009-0095896 A | 9/2009 |

\* cited by examiner

METHOD FOR CONTROLLING RANDOM ACCESS FOR THE EFFICIENT SENSING OF THE COOPERATIVE SPECTRUM IN A COGNITIVE RADIO-BASED FREQUENCY RESOURCE SHARING SYSTEM

CROSS REFERENCE TO RELATED APPLICATIONS

This application is the National Phase of PCT/KR2011/000453 filed on Jan. 21, 2011, which claims priority under 35 U.S.C. 119(e) to U.S. Provisional Application No. 61/352,830 filed on Jun. 9, 2010, all of which are hereby expressly incorporated by reference into the present application.

TECHNICAL FIELD

The present invention relates to a cognitive RF technology.

BACKGROUND ART

Radio wave resources are limited national intangible assets, and the use of wireless devices is sharply increasing. Accordingly, the value of the radio wave resources is gradually increasing. In particular, as services using a wireless technology sharply increase, such as radio frequency identification/ubiquitous sensor networks (RFID/USN) and ultra wide band (UWB) communication and wireless broadband (WiBro) as well as mobile communication, wireless LAN, digital broadcasting, and satellite communication, demand for the limited radio wave resources is persistently increasing.

As such, limited frequency resources must be shared between different systems in an environment where different kinds of communication networks are distributed in the same region, giving rise to the problem of interference. Therefore, interference management is needed to solve this problem, for which cognitive radio (CR) and cooperative communication are powerfully emerging as a base technology.

As such, in order to use these important radio wave resources efficiently, developed countries including US develop technologies under the leadership of governments and actively are pushing ahead activities to establish radio wave policies on based on the technologies.

While radio wave policies in the past were based on command and control in such a manner that governments established and managed policies, it is predicted that radio wave policies in the future will be diverted to open spectrum policies.

Regarding this, the cognitive radio (CR) technology is an idea that has developed a software defined radio technology (SDR) to enhance the use efficiency of spectrum, and has been first suggested by "Joseph Mitola III". The listen before talk (LBT) of RFID or the dynamic frequency selection (DFS) of WLAN, etc. that have been suggested so far in some fields correspond to cognitive radio of the beginning level, and systematic establishment on that has been made by the completion of thesis by "Mitola III".

The cognitive RF technology may be said to be an intelligent RF technology that wireless terminals automatically perform optimal communication through learning and adaptation to surrounding communication environments.

FIG. 1 is an exemplary diagram illustrating a cognitive RF technology.

As seen with reference to FIG. 1, the terminal 11 of a primary user (PU) has a license for the corresponding spectrum of RF resources and a priority when using the corresponding spectrum. The occupancy of RF resources by the primary user dynamically arises in a space or time dimension.

At this point, the cognitive RF technology enables a spectrum overlay access scheme in which the terminal 12 of a secondary user finds and uses an empty resource not used by the primary user through spectrum sensing.

The secondary secondary user has become to be able to use the spectrum of the primary user through the spectrum overlay. Using the spectrum of the primary user by the secondary user was difficult in the related art.

However, since the secondary user is a user not permitted to the RF resources, he/she must find and use only the spectrum not used by the primary user and must yield the use of the spectrum even during transmission of data if the primary user attempts to the corresponding spectrum. For this reason, the secondary user must sense the corresponding spectrum, regularly.

Examples of ways of implementing the spectrum sensing include matched filter detection, feature detection, and energy detection.

The matched filter detection and feature detection must previously know primary user signal information. However, it is difficult to previously know the primary user signal information, a reason for which is as follows. First, even in an environment where the map information of TV band database (TVDB) representing the use band of TV white space (TVWS) may be obtained, non-standard equipment, such as an RF microphone may be used. In addition, since different kinds of unlicensed instruments may be simultaneously used in the TVWS such as an environment using the standard IEEE 802.19, signal features may not be known.

Thus, the energy detection is generally used.

The performance of the spectrum sensing including energy detection is greatly influenced by the signal to noise ratio (SNR) of the received primary user signal. Such influence mainly results from shadowing due to a tomographic change and fading according to a multiple path feature. Typical problems due to the shadowing and fading may include a hidden terminal problem. If the hidden terminal problem occurs, the transmission by the primary user is hindered since the secondary user transmits while the signal for the primary user has not been detected.

DISCLOSURE

Technical Problem

Thus, embodiments presented in the specification are to solve the problems described above. In particular, embodiments presented in the specification are to be able to efficiently detect the signals from the primary user.

Technical Solution

To achieve the objects described above, according to an embodiment of the invention, a method where many terminals detect together signals of a primary user is provided. In addition, according to an embodiment of the invention, a method where a determination may be made more quickly when each of various terminals detects the signals of the primary user and determines whether there is an actual signal is provided.

More particularly, an embodiment of the invention provides a method for performing spectrum sensing to detect a signal for a terminal of a primary user in each sensing node. The method for performing spectrum sensing may comprise performing, by the sensing node, spectrum sensing to detect a signal for a terminal of a primary user; computing, by the sensing node, a local test statistic value on the basis of the result of the spectrum sensing; calculating, by the sensing node, a transmission probability on the basis of the computed local test statistic value; and transmitting, by the sensing node, sensing information to a fusion center on the basis of the calculated transmission probability. At this point, it may be determined whether there is a signal for a terminal of a primary user on the basis of the transmitted sensing information at the fusion center.

The sensing information may include the local test statistic value. The local test statistic value may include the energy value of the primary user received from the sensing node.

The transmission probability may be determined on the basis of a size of a local test statistic value. The greater the local test statistic value is, the greater the transmission probability may become, and the smaller the local test statistic value is, the less the transmission probability may become.

The step of calculating the transmission probability may include the step of performing, by the sensing node, order detection detecting how greatest its local test statistic value is among statistic values by other sensing nodes in size; and the step of determining the transmission probability according to the result of the order detection.

The transmission probability may be determined to be harmonically proportional to the ascending order of the detected order.

The sum of the transmission probability determined by the sensing node and the transmission probabilities determined by other sensing nodes may be 1.

The transmission probability may be determined on the basis of the probability of the size by a cumulative distribution function of a Gaussian distribution.

Meanwhile, to achieve the object described above, an embodiment of the invention provides a sensing apparatus for performing spectrum sensing to detect a signal for a terminal of a primary user. The apparatus may comprise a transceiving unit configured to perform spectrum sensing to detect a signal for a terminal of a primary user by a sensing node; and a processor configured to compute a local test statistic value on the basis of the result of the spectrum sensing, calculate a transmission probability on the basis of the computed local test statistic value, and transmit sensing information to a fusion center on the basis of the calculated transmission probability by the sensing node. The transmitted sensing information may be used to determine whether there is a signal for a terminal of a primary user at the fusion center.

Advantageous Effects

Thus, according to embodiments presented in the specification, the problems of the related art described above are solved. In particular, according to embodiments presented in the specification, a signal for a terminal of a primary user may be efficiently detected.

MODE FOR INVENTION

Figure 1:
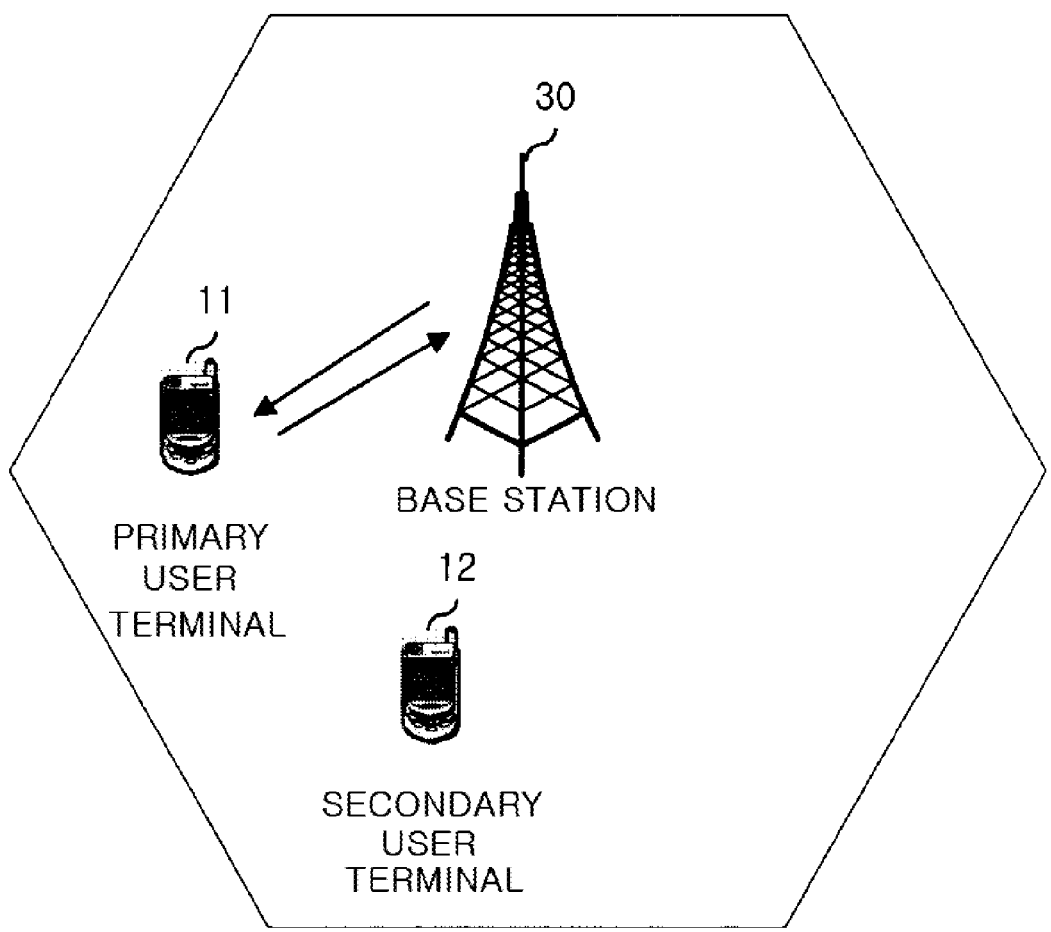
FIG. 1 is an exemplary diagram illustrating a cognitive RF technology.

It should be noted that the technical terms used herein are to only describe specific embodiments and are not intended to limit the invention. In addition, the technical terms used herein should be construed as meaning generally understood by those skilled in the art in the technical field to which the invention pertains unless being specially defined herein as other meanings and should not be construed as excessively comprehensive or narrow meanings. In addition, if the technical terms used herein are wrong technical terms that do not correctly represent the spirit of the invention, they should be replaced with technical terms that may correctly be understood by those skilled in the art. In addition, general terms used herein should be construed as defined in a dictionary or according to the context and should not be construed as excessively narrow meanings.

In addition, the terms in a singular form herein may include plural forms unless referred explicitly to the contrary. The terms "include", "comprise", etc. in this application should not be construed to necessarily include various components or several steps all described herein but should be construed that some components or steps among them may not be included or further components or steps may further be included.

In addition, though terms including ordinal like a first, a second, etc. may be used to describe various components, the components should not be defined by the terms. The terms are used only for the purpose of distinguishing one component from another component. For example, a first component may be named a second component without departing from the scope of a right of the invention and, similarly, the second component may also be named the first component.

When being mentioned that a certain component is "connected" or "coupled" to another component, the former may directly be connected or coupled to the latter but the third component may exist between them. On the other hand, when being mentioned that a certain component is "directly connected" or "directly coupled" to another component, it should be understood that the third component does not exist between them.

Exemplary embodiments of the invention will be described in detail with reference to the accompanying drawings below. The same or similar components regardless of the drawing numbers are given the same reference numerals and are not again described. In addition, if it is determined detailed descriptions related to a well-known technology may obscure subject matters of the invention in describing the invention; the detailed descriptions will be ruled out. In addition, it should be noted that the accompanying drawings are used to make the spirit of the invention easily understood and it should not be construed that the spirit of the invention is limited by the accompanying drawings. It should be construed that the spirit of the invention is expanded to all the changes, equivalents and replacements in addition to the accompanying drawings.

Although a terminal is used below, it may be referred to as user equipment (UE), mobile equipment (ME), a mobile station (MS), a user terminal (UT), a subscriber station (SS), a mobile subscriber station (MSS), a wireless device, a handheld device, an access terminal (AT). In addition, the terminal may be devices that are possible to be portable, such as a mobile phone, a PDA, a smart phone, a wireless modem, a notebook, etc. or may be devices that are difficult to be portable, such as a PC or on board equipment.

Figure 2:
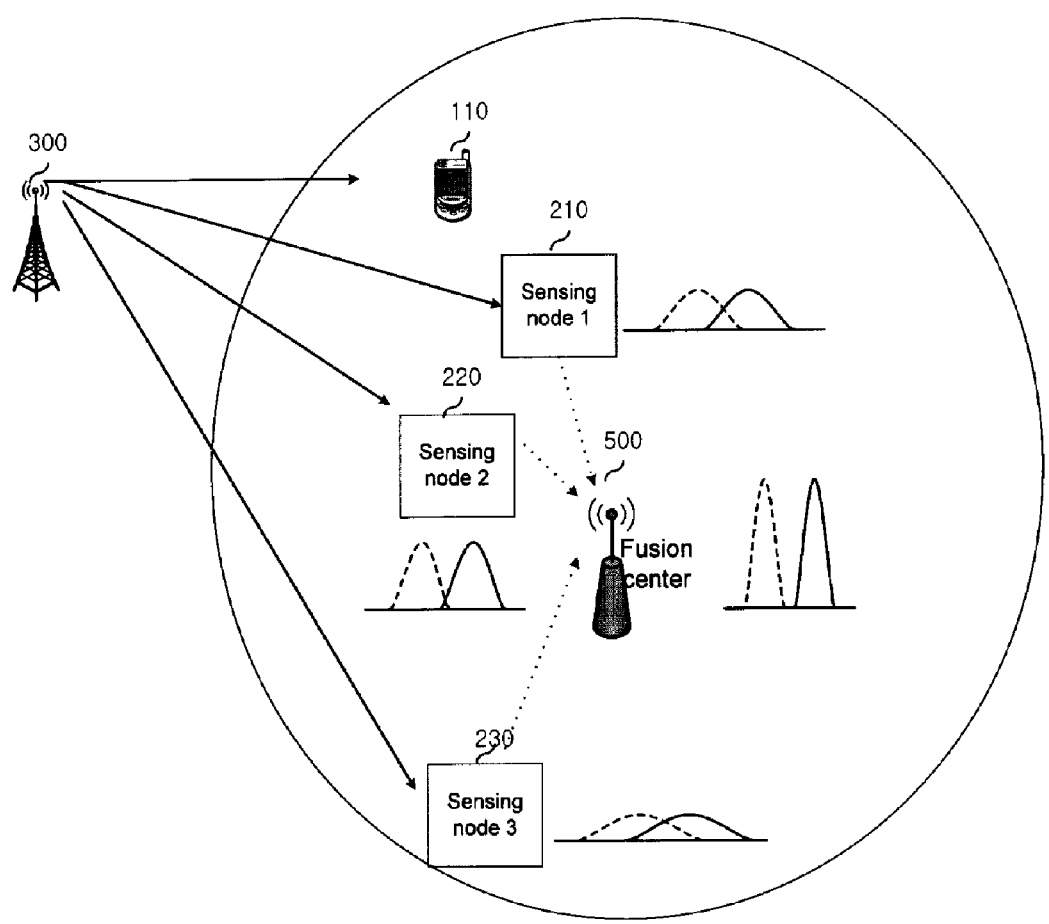
FIG. 2 is an exemplary diagram illustrating cooperative spectrum sensing.

FIG. 2 is an exemplary diagram illustrating cooperative spectrum sensing.

Cooperative sensing has been suggested and studied to overcome the deterioration in spectrum sensing performance due to tomographic factors and channel variations mentioned above.

As illustrated in FIG. 2, K sensing nodes 210 to 230 that are spatially distributed on a signal for a primary user 110, individually sense during a sample period. At this point, it is assumed that each sensing node experiences path loss, shadowing, and Rayleigh fading between them. In addition, each sensing node transmits local sensing information or sensing result, to a fusion center 500. Two peaks illustrated at the sensing result illustrate probability distributions when there is no signal for a primary user (corresponding to a dotted line on the left side) and when there is a signal for a primary user (corresponding to a solid line on the right side). The detected energy value may be transmitted to a fusion center through a separate control channel. At this point, the sensing information is transmitted through sampling and quantization processes actually, but it is assumed in the specification that transmission completely ends during a slot period.

Then, the fusion center 500 sums pieces of sensing information of each region and determines whether there is a signal for the primary user.

In other words, it may be determined whether there is a signal for a primary user, based on the probability distribution on the energy detected from individual sensing node. When a scheme is used where a central fusion center adds energy detected from individual sensing node, the intensity of a signal becomes large compared to noise. Thus, a probability distribution narrows and the gap between two distributions widens, enabling energy to be detected more accurately. As such, when added sensing information exceeds a threshold for target detection probability, a detection of a signal for a primary user is carried out.

The fusion center 500 plays a role in adding sensing information, making a final determination, informing each node attempting to transmit of information related to the use of frequency resources and controlling the node.

At this point, two schemes of combining sensing information at the fusion center may be considered. One is a soft fusion scheme where an original sensing information value intended for sensing is transmitted as it is, and these signals are added to make a determination. The other is a hard fusion scheme where only a value on whether a determination has been made after sensing at each sensing node is transmitted, and these results are collected to determine the sensing result.

Using soft fusion may be said to be ideal as sensing performance, since transmitted signal values themselves may be added without loss. However, since a control channel must transmit all the signals from each sensing node to the fusion center, various matters must actually be considered, such as an influence by a correlated channel, the non-uniform distribution matter of sensing nodes, and a feedback matter.

First, a description of an influence by the correlated channel is made. If each sensing node receives signals from a common transmitter, a high correlation is detected between adjacent receiving nodes in terms of channel gain and final sensing performance decreases, in some cases. In particular, a problem occurs if sensing nodes are not sufficiently away but close to one another.

A description of the non-uniform distribution matter of sensing nodes is made. This matter is an opposite idea to the influence of the correlated channel above and the SNR difference of the signals received from each node becomes large if each sensing node is geographically isolated from one another. In such a case, a scheme of giving a weight to a specific may be considered rather than a simple combination at the fusion center.

Last, a description of the feedback matter is made. Since information with a soft value for each sensing node is transmitted to the fusion center each time, a burden related to this increases. In particular, if there are many sensing nodes, a situation may occur where it may become difficult to transmit their information, since the amount of information to be feedback is too much.

On the other hand, if the hard fusion scheme is used, sensing performance decreases but feedback matter may be simply solved. The hard fusion scheme may decrease a burden on feedback, since each sensing node is just needed to determine by itself and transmit only a binary decision according to that. However, if a sensing node makes a wrong determination, this causes an error propagation phenomenon and decreases sensing performance. Thus, the performance of the hard fusion scheme may be lower compared to the soft fusion scheme.

In case of the hard fusion scheme, the fusion center 500 may consider two matters as described below.

1) Fusion Rule: If binary decisions are collected, the fusion center 500 must find a final decision based on these values. To that end, the fusion center 500 may use many schemes for combining each binary decision. An AND rule means determining to be present only if all decisions determine that there is a signal, and an OR rule means determining to be present even if at least one decision determines that there is a signal.

2) Local Detection Error and Feedback Error: Individual sensing node may have a detection error, or even if a determination value has been correctly detected, an error arises in a feedback process. Since such an error decreases the overall sensing performance, the fusion center 500 may correct such an error.

The cooperative spectrum sensing as described above is a scheme where a central fusion center collects and lastly detects signals for primary users detected from various secondary user sensing nodes. Thus, as the number of individual sensing node increases, a signal for a primary user is detected with more sensing information and sensing accuracy increases, but on the contrary, since the amount of information to be transmitted to the fusion center simultaneously increases, a waste of resources increases by overload due to that.

Therefore, a method for transmitting local sensing information is required, which may satisfy a target sensing accuracy and decrease overload.

As such, two schemes of centralized transmission and distributed transmission may be considered when transmitting local sensing information to the fusion center 500.

First, the centralized transmission is a scheme where a central controller controls everything including when and how to transmit out is controlled on individual node through a polling process. In this scheme, individual node does not collide with one another but it may have drawbacks that as the number of nodes increases, a transmission control burden increases, and flexibility decreases.

On the other hand, the distributed transmission is a scheme where individual node determines by itself when to transmit through a respective collision avoidance technique. Thus, since there is no need for a central controller, the distributed transmission does not have a transmission control burden and is advantageous to implementation. However, when the distributed transmission between individual nodes is carried out, the distributed transmission greatly influences performance according to the collision avoidance technique. Such a collision avoidance technique is implemented by a random access control technique and typical collision avoidance techniques include ALOHA or CSMA as the random access control technique.

Meanwhile, it is also important to shorten a detection time that is a time taken to detect a signal for a primary user in cooperative spectrum sensing.

The reason is that even if a secondary user checks the empty section of a primary user and then performs transmission, the primary user may resume transmission and use spectrum during transmission by the secondary user. In this case, the secondary user must empty spectrum after detecting the signal for the primary user. Since the shorter the detection time is, the more quickly spectrum is emptied, a damage to the primary user by collision may be minimized and the primary user may be protected more effectively.

Figure 3:
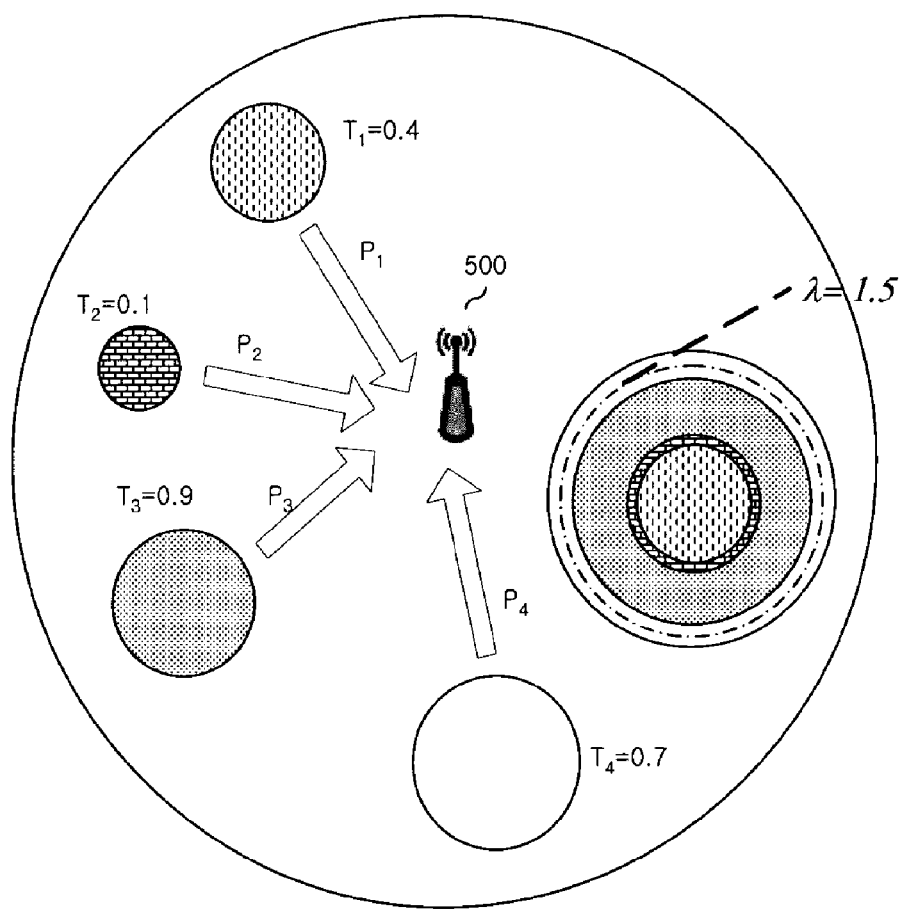
FIG. 3 is an exemplary diagram illustrating an example of transmitting the energy detected from an individual node to a central fusion center according to a distributed transmission scheme according to a first embodiment.

FIG. 3 is an exemplary diagram illustrating an example of transmitting the energy detected from an individual node to a central fusion center according to a distributed transmission scheme according to a first embodiment.

As seen with reference to FIG. 3, it is assumed that there are a total of four nodes and energies of 0.4, 0.1, 0.9 and 0.7 have been detected from respective nodes. Each node transmits the detected energy value to the fusion center 500, and the fusion center 500 completes the detection on a signal for a primary user, if a threshold exceeds 1.5 when the energy values have been added.

Meanwhile, the spectrum sensing performance may be found as follows.

First, if $H_0^k$ is a null hypothesis that there is no signal for a primary user at the sensing node k and $H_1^k$ is an alternative hypothesis that there is a signal for a primary user, then the signal $x_k(n)$, which is the signal s(n) transmitted from a common primary user and received in the sample n of the sensing node k of, is represented as the following Equation 1. The primary user signal s(n) is assumed as a complex phase shift keying (PSK) signal. Meanwhile, $h_k(n)$ is a channel gain value by fading at the sensing node k and is modeled to $h_k(n) \sim CN(0, \sigma_h^2)$ since Rayleigh fading is assumed. $w_k(n)$ is noise that arises at the sensing node k, and is modeled to $w_k(n) \sim CN(0, \sigma w^2)$ since AWGN is assumed.

$$H_0^k: x_k(n) = w_k(n)$$
$$H_1^k: x_k(n) = h_k(n)s(n) + w_k(n) \qquad \text{<Equation 1>}$$

Test statistic T that may be obtained by the fusion center 500 through an energy detector and the soft fusion is found by the following Equation 2. At this point, $Y_k$ is energy of the primary user signal received from the sensing node k.

$$T = \sum_{k=1}^{K} Y_k = \sum_{k=1}^{K} \sum_{n=1}^{N} |x_k(n)|^2 \qquad \text{< Equation 2 >}$$

A total of test statistics T may be found by adding energy received from each sensing node. The test statistic follows a Gaussian probability distribution under the above assumption and is represented by the following Equation 3.

$$H_0: T \sim N(KN\sigma_w^2, KN\sigma_w^4)$$
$$H_1: T \sim N(ND(\sigma_h^2 + \sigma_w^2), KN(\sigma_h^2 + \sigma_w^2)^2) \qquad \text{<Equation 3>}$$

Spectrum sensing performance may be found through such a probability distribution. The spectrum sensing performance is represented through a false alarm probability and a detection probability. The false alarm probability represents a probability at which an error arises to be determined that there is a primary user signal although there is no primary user signal. Since false alarm arises if the energy by noise is a threshold λ, or more, the false alarm probability is calculated by the following Equation 4.

$$P_{FA} = Pr\{T > \lambda; H_0\} = Q\left(\frac{\lambda - KN\sigma_w^2}{\sqrt{KN\sigma_w^4}}\right) \qquad \text{< Equation 4 >}$$

Meanwhile, the detection probability represents a probability that correctly determines that there is a primary user signal. Since this is when energy by the primary user signal and noise is a threshold or more, the detection probability is calculated by the following Equation 5.

$$P_D = Pr\{T > \lambda; H_1\} = Q\left(\frac{\lambda - KN(\sigma_h^2 + \sigma_w^2)}{\sqrt{KN(\sigma_h^2 + \sigma_w^2)^2}}\right) \qquad \text{< Equation 5 >}$$

Meanwhile, if a target detection probability is determined, a threshold for obtaining the probability is represented by the following Equation 6 by the arranging of Equation 5 for λ.

$$\lambda = (\sigma_h^2 + \sigma_w^2)(KN + \sqrt{KN}Q^{-1}(P_D^t)) \qquad \text{<Equation 6>}$$

The test statistic measured at individual sensing node may be implemented through a random access control scheme and considers a slotted-ALOHA scheme among others.

At this point, the same transmission probability is first allocated to each sensing node in a traditional slotted-ALOHA scheme. In other words, when there are K sensing nodes, the transmission probability of each sensing node is equally allocated to all nodes as $P_k=1/K$. Each sensing node determines according to a given probability $P_k$ whether to transmit and succeeds in transmitting if only one of the K sensing nodes attempts to transmit. While a transmission slot proceeds, the test statistic of individual sensing node is cumulated at the fusion center. As soon as the cumulated test statistics T exceeds a threshold $\lambda$, a primary user signal is detected and transmission stops.

As such, a description of an example of allocating the same transmission probability to each sensing node is as follows.

First, as illustrated in FIG. 3, assume that each sensing node has sequentially sensed energy values of 0.4, 0.1, 0.9, 0.7. Then, since each sensing node has the same transmission probability, any sensing node may first perform transmission.

Thus, transmission to the fusion center 500 may be performed in the order of the energy values, 0.4, 0.1, 0.9, 0.7 depending on the situation. Then, when the fusion center has received in the order of the energy values, 0.4, 0.1, 0.9, it is determined not to exceed threshold 1.5 since a sum is 1.4 at present. After an energy value of 0.7 has been received last, the fusion center 500 determined that there is a signal for a primary user since a sum of energy exceeds the threshold 1.5.

As such, when each sensing node transmits sensing result at the same transmission probability, it may sometimes take a rather long time for the fusion center 500 to detect a correct result.

Thus, a random access control scheme is newly suggested for distributed cooperative spectrum sensing below. The suggested technique suggests a scheme that minimizes a detection time while satisfying a target detection probability given for a primary user signal. This is described in detail with reference to FIG. 4 as follows.

Figure 4:
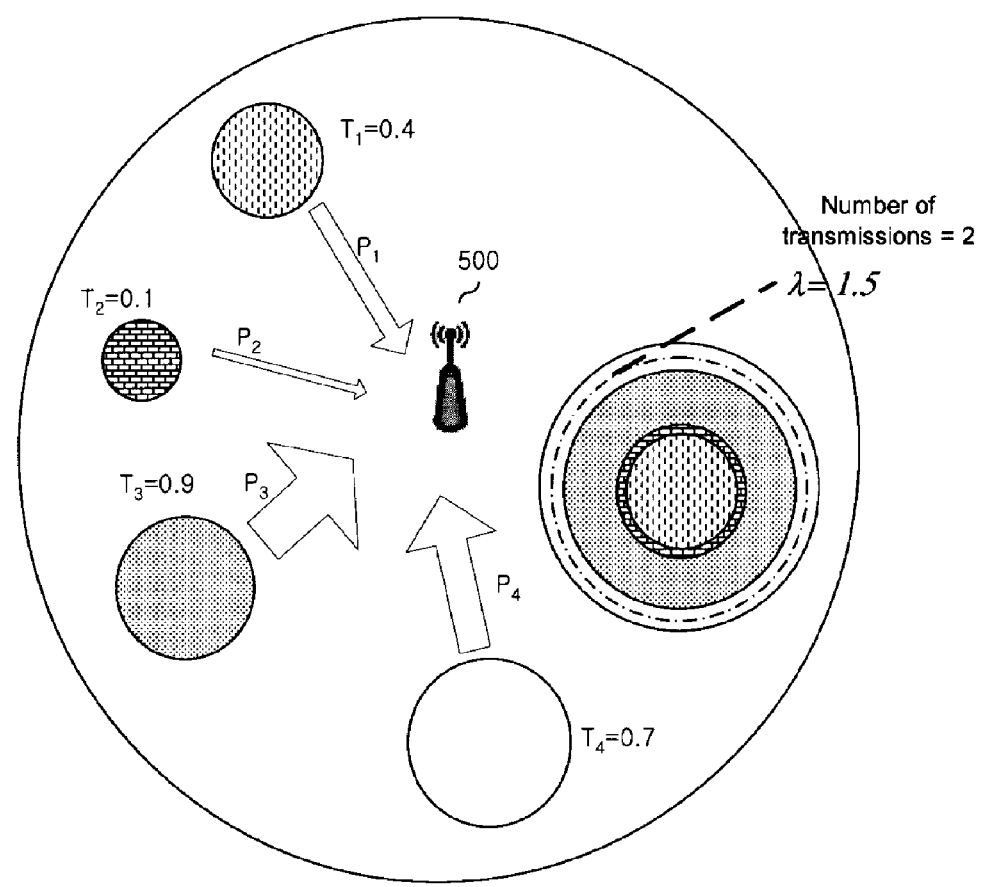
FIG. 4 is an exemplary diagram illustrating a method for transmitting the energy detected from an individual node to a central fusion center according to a distributed transmission scheme according to a second embodiment.

FIG. 4 is an exemplary diagram illustrating a method for transmitting the energy detected from an individual node to a central fusion center according to a distributed transmission scheme according to a second embodiment.

As seen with reference to FIG. 4, a technology suggested in a second embodiment of the invention differentially determines transmission probabilities $P_k$ for an individual sensing node to minimize the total detection time, unlike a transmission technique according to the related art.

Although a common primary user signal is received, an individual sensing node obtains different sizes of test statistics due to the effect of fading and the statistic feature of noise. At this point, an order in which test statistic is transmitted from an individual sensing node to a fusion center is controlled. Thus, a sensing node with large test statistic has a higher priority to enable earlier transmission, and a sensing node with small test statistic has a lower priority to enable later transmission.

When these processes have been performed, a time when a summed test statistic exceeds a threshold may be shortened on average since there is an effect of being summed sequentially from large test statistic at the fusion center. Accordingly, a primary user signal is more quickly detected while satisfying a target detection probability so that hindering the transmission of a primary user may be minimized.

In other words, according to a second embodiment of the invention, since transmission is first carried out from a node with a large amount of local sensing information detected from an individual node, the invention may excess a threshold for detection, more quickly.

As such, a transmission probability $P_k$ to minimize the detection time while satisfying a given target detection probability may define an optimization matter as in Equation 7.

At this point, $\bar{p}=[p_1, p_2, \ldots, p_k]$ represents transmission probabilities for K sensing nodes in a vector form. An objective function E[l] means the average of the number l of slot transmission times required for detection. A first constraint is that the total test statistic becomes a threshold or more, so detection must succeed. By satisfying the first constraint, a target detection probability is satisfied. The reason is that a given threshold is calculated to satisfy the target detection probability. In addition, the other two constraints are that a sum of the overall transmission probability must become 1 and each transmission probability must have a value between 0 and 1.

$$\min_{\bar{p}} E[l] \qquad \qquad <\text{Equation 7}>$$
$$T \geq \lambda$$
$$\sum_{k=1}^{K} p_k = 1$$
$$0 \leq p_k \leq 1, k = 1, \ldots, K$$

Since the optimization matter defined above is difficult to represent the average number of slot transmission times E[l] as a general expression for a transmission probability $\bar{p}$, Equation 7 is not solved at a time but is sequentially solved by order detection that decides the order of local test statistic for an individual node, and transmission probability allocation that decides a transmission probability according to a detected order.

First, the order detection means the following. After spectrum sensing at an individual sensing node, it is determined how largest test statistic the corresponding sensing node is among the overall sensing nodes, through a found local test statistic $Y_k$. If an estimate is decided for the order of the test statistic of sensing nodes through the order detection, a greater transmission probability is allocated to a node with a great test statistic estimate (a node with a higher order) and a less transmission probability is allocated to a node with a smaller test statistic estimate (a node with a lower order).

In detecting the order, two cases are considered. In one case, the SNR of a primary user signal detected at each sensing node is independent and identical (IID), and in the other case, the SNR is independent but non-identical (INID).

First, in case of IID, local test statistic $Y_k$ follows a Gaussian distribution that has instantaneously non-identical values due to the effect of fading whenever spectrum sensing but has statistically identical average. In addition, if there is a primary user signal ($H_1$), the local test statistic $Y_k$ is represented by the following Equation 8.

$$Y_k \sim N(N(\sigma_y^2+\sigma_w^2), N(\sigma_h^2+\sigma_w^2)^2) \qquad <\text{Equation 8}>$$

Order statistics are used for order detection. It is assumed that the local test statistics found from individual sensing nodes are $Y_1, Y_2, \ldots, Y_k$ and these distributions are independent and follow a probability density function (PDF) $f_Y(y)$ and a cumulative distribution function (CDF) $F_Y(y)$. At this point, the test statistics may be arranged in an ascending order to find $Y_{1:K} \leq Y_{2:K} \leq \ldots \leq Y_{K:K}$ and it is defined as order statistics. PDF for a $k^{th}$ general order statistic is arranged by the following Equation 9.

$$f_{Y_{k:K}}(y) = \frac{K!}{(k-1)(K-k)!} F_Y(y)^{k-1}(1-F_Y(y))^{K-k} f_Y(y) \qquad <\text{Equation 9}>$$

If PDF and CDF by the Gaussian distribution in Equation 8 are applied to Equation 9, the PDF of the order statistic on local test statistic may be found by the following Equation 10.

$$f_{Y_{k:K}}(y) = \frac{K!}{(k-1)!(K-k)!} \cdot \left[\frac{1}{2}\left(1+\text{erf}\left(\frac{y-\mu}{\sigma\sqrt{2}}\right)\right)\right]^{k-1} \times \qquad <\text{Equation 10}>$$
$$\left[1-\frac{1}{2}\left(1+\text{erf}\left(\frac{y-\mu}{\sigma\sqrt{2}}\right)\right)\right]^{K-k} \cdot$$
$$\frac{1}{\sqrt{2\pi\sigma^2}} \exp\left(-\frac{(y-\mu)^2}{2\sigma^2}\right)$$

The mean $\mu=N(\sigma_h^2+\sigma_w^2)$ and the standard deviation $\sigma=\sqrt{N}(\sigma_h^2+\sigma_w^2)$ from Equation 8 are used for that.

If a probability distribution on the order statistic is obtained, the order on the test statistic may be estimated for each sensing node. In other words, it may be recognized how largest test statistic each node has among the overall nodes. An order $\hat{m}$ that satisfies the following Equation 11 is detected for an individual sensing node under the assumption that the distribution of an order $\alpha_m$ has previously been known using maximum likelihood (ML) detection for the order detection.

$$\hat{m}_k = \underset{m_k}{\text{argmax}}\, f_{Y_{k:K}}(y_k|a_m)f(a_m) \qquad <\text{Equation 11}>$$

Figure 5:
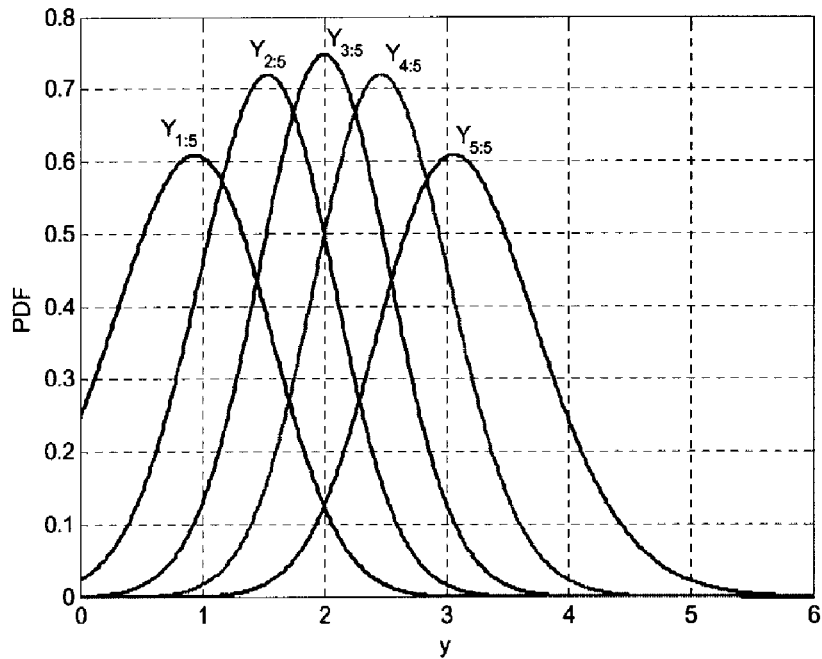
FIG. 5 illustrates an example of detecting an order using the probability distribution of order statistics in case of IID according to a second embodiment of the invention.

To help with the understanding, when K=5, $\mu$=2, and $\sigma$=1, the PDF of the order statistic on the Gaussian distribution has been illustrated in FIG. 5.

An order with a maximum value may be found by comparing local detection statistic $Y_k$ instantaneously found in a distribution decided like this with a posteriori probability (APP). At this point, if "equally likely" is assumed, a minimum distance detection technique may be used. In this case, detection is possible based on the boundary between PDFs. The boundary between distribution k and distribution k+1 is found by the following Equation 12.

$$f_{Y_{k:K}}(y)=f_{Y_{k+1:K}}(y) \text{ for } k=1,\ldots,K-1 \qquad <\text{Equation 12}>$$

If Equation 10 is applied and arranged, the boundary $y^*_{k|k+1}$ between the distribution k and the distribution k+1 for a Gaussian distribution may be found by the following Equation 13.

$$y^*_{k|k+1} = \mu + \sigma\sqrt{2}\, \text{erf}^{-1}\left(\frac{2k}{K}\right) \qquad <\text{Equation 13}>$$

The order of a specific sensing node among the overall sensing nodes may be determined through this process.

Meanwhile, in case of INID, local test statistic $Y_k$ has a difference not only instantaneously but also on average, due to the effects of path loss and shadowing as well as the effect of fading. Regarding this, if there is a primary user signal ($H_1$), the local test statistic is represented by the following Equation 14.

$$Y_k \sim N(N(\sigma_{h,k}^2+\sigma_w^2), N(\sigma_{h,k}^2+\sigma_w^2)^2) \qquad <\text{Equation 14}>$$

At this point, CDF on the order statistic K may recursively be found [10]. First, if K=1, the CDF is found by the following Equation 15.

$$F_{Y_{1:K}}(y) = 1 - \prod_{i=1}^{n}(1-F_Y^{(i)}(y)) \qquad <\text{Equation 15}>$$

Meanwhile, if k=2, ..., K, the CDF is recursively found by the following Equation 16.

$$F_{Y_{k:K}}(y)=F_{Y_{k-1:K}}(y)-H_k(y)(1-F_Y^{(i)}(y)) \qquad <\text{Equation 16}>$$

$H_k(y)$ in Equation 16 is defined by the following Equation 17.

$$H_k(y) = \frac{1}{k-1}\sum_{i=1}^{k-1}(-1)^{i+1}L_i(y)H_{k-i}(y) \qquad <\text{Equation 17}>$$

$L_k(y)$ in Equation 17 is arranged by the following Equation 18.

$$L_k(y) = \sum_{k=1}^{K}\left[\frac{F_Y^{(i)}(y)}{1-F_Y^{(i)}(y)}\right]^k \qquad <\text{Equation 18}>$$

Figure 6:
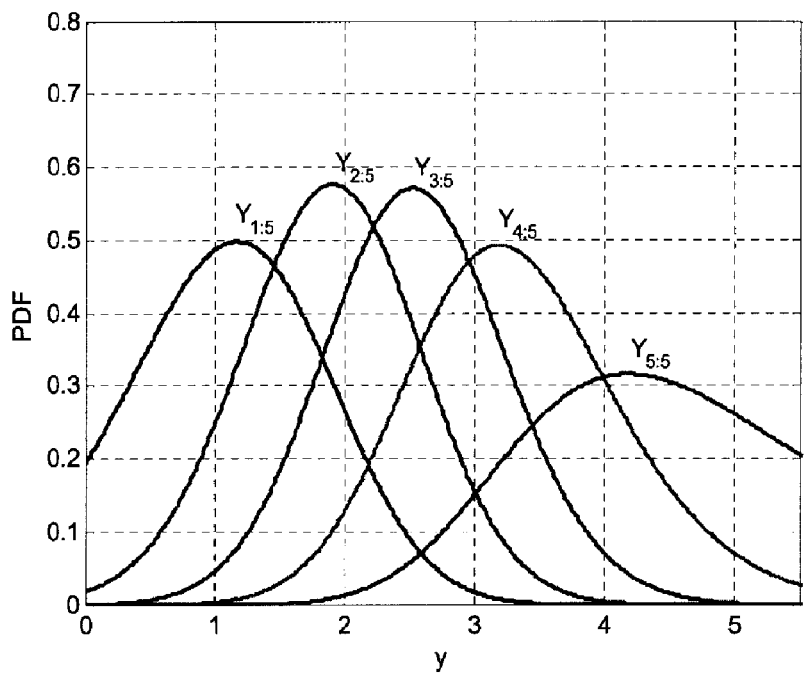
FIG. 6 illustrates an example of detecting an order using the probability distribution of order statistics in case of INID according to a second embodiment of the invention.

As in case of IID through CDF and PDF found through this, ML detection may be performed to perform order detection. In order to compare to the case of IID, when K=5, $\mu$=[2, 4, 3, 2.2, 2.4] and $\sigma$=[1, 2, 1.5, 1.1, 1.2], then the PDF of the order statistic on a Gaussian distribution has been represented in FIG. 6.

Since order detection is made for individual sensing node, $m_k$ is found for all the sensing nodes and then a transmission probability is found based on this.

The invention considers two transmission schemes that are linear probability allocation (LPA) where a transmission probability is allocated to be proportional to the detected order and harmonic probability allocation (HPA) where a transmission probability is allocated to proportional to harmonic progression. First, in case of LPA, a transmission probability is allocated to be proportional to a value $m_k$ and so that a sum of the transmission probabilities of the overall nodes becomes 1. The transmission probability is represented by the following Equation 19.

$$p_k^{LPA} = \frac{2m_k}{K(K+1)} \qquad <\text{Equation 19}>$$

Meanwhile, in case of HPA, a transmission probability is allocated to be proportional to the reverse order of a value $1/m_k$ and a sum of the transmission probabilities of the overall nodes becomes 1 as in case of LPA. In case of HPA, a transmission probability allocated to an individual sensing node is represented by the following Equation 20. At this point, $H_k$ is harmonic number k and is defined as $H_k=\sum_{i=1}^{k}1/i$.

$$p_k^{HPA} = \frac{1}{K+1-m_k} \frac{1}{H_K} \qquad <\text{Equation 20}>$$

Figure 7:
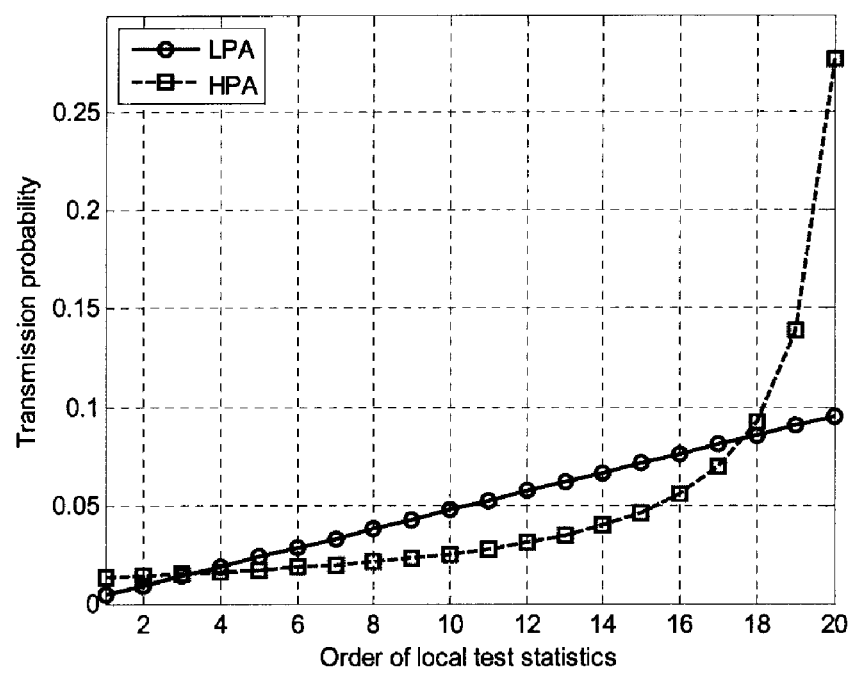
FIG. 7 illustrates an example of allocating a transmission probability in LPA and HPA according to a second embodiment of the invention.

In order to check the transmission probability allocating features of LPA and HPA, when it is assumed that K=20, a transmission probability $P_k$ allocated according to $m_k$ is represented in FIG. 7. Both LPA and HPA allocate a greater transmission probability if an order for local test statistic is greater and a less transmission probability if the order is less, in common. However, while LPA allocates to be proportional to the order, HPA leads to a great deviation in an allocated probability.

While the order detection described above and the transmission probability allocation according to the detected order have great enhancement in performance, complexity due to ML detection increases when detecting the order.

Thus, according to an embodiment of the invention, a direct mapping (DM) scheme is further suggested where a transmission probability is allocated directly without detecting the order from the energy value detected from a sensing node. An individual test statistic $T_k$ detected from an individual sensing node k has a Gaussian distribution as described above. Dimensional probabilities for the overall samples may be found through the Q-function Q(•) of a Gaussian distribution from the energy value detected.

By applying the probability to a transmission probability as it is, the transmission probability may be found by the following Equation 21.

$$p_k^{DM} = \frac{2Q((T_k - \mu)/\sigma)}{K} \qquad <\text{Equation 21}>$$

Figure 8:
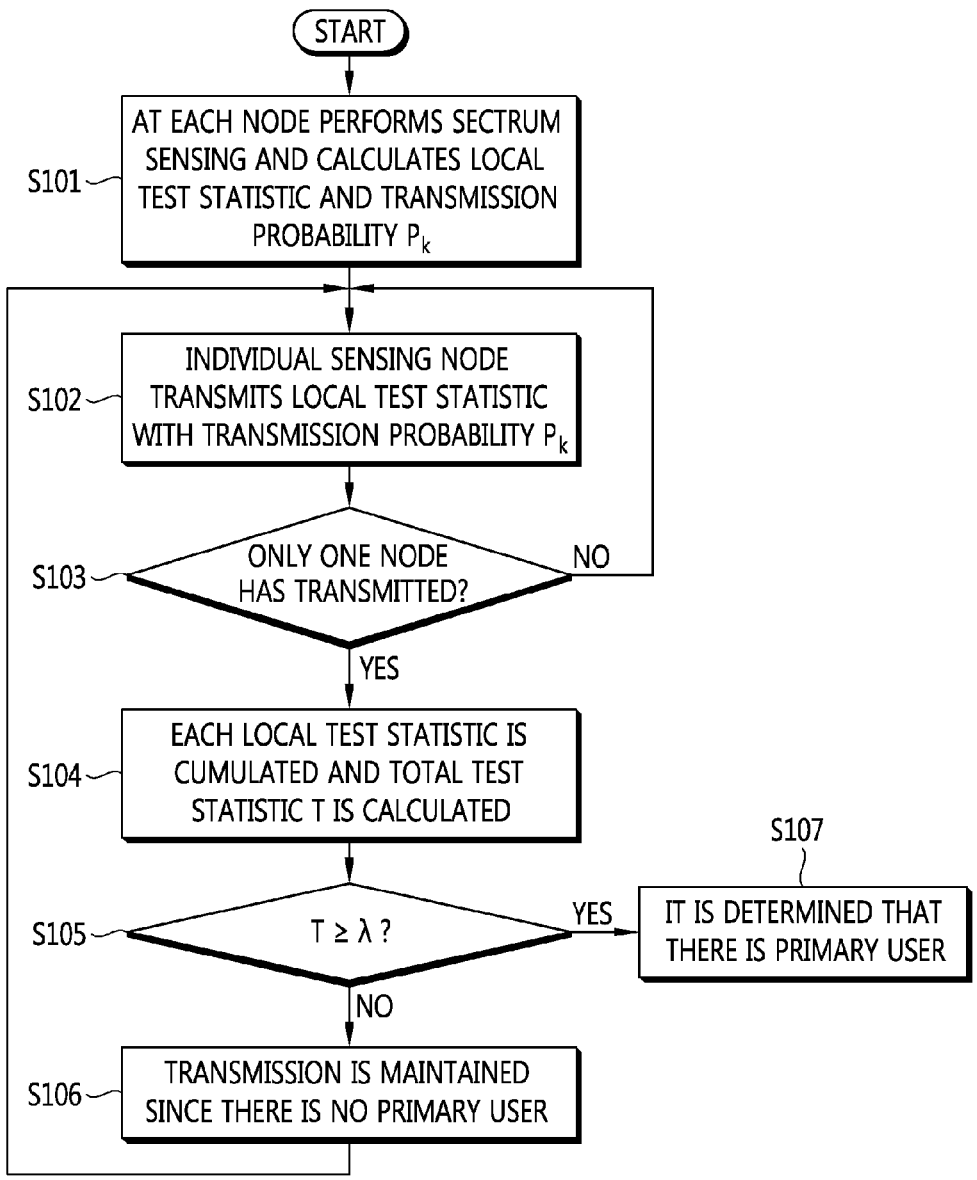
FIG. 8 is an exemplary diagram illustrating a method according to a second embodiment of the invention in a flow chart.

FIG. 8 is an exemplary diagram illustrating a method according to a second embodiment of the invention in a flow chart.

As seen with reference to FIG. 8, for a spectrum sensing period, each of K sensing nodes detects energy, finds local test statistic $Y_k$, and calculates a probability $P_k$ to transmit the local test statistic $Y_k$ to a central fusion center, in step S101.

Each sensing node transmits its local test statistic $Y_k$ to the fusion center with a probability of its transmission probability $P_k$, in step S102. If only a sensing node performs transmission at a time in step S103, corresponding test statistic is transmitted to the fusion center. However, if two or more sensing nodes simultaneously performs transmission, then collision occurs in step S103, and test statistic respectively transmitted is not received.

The fusion center calculates the total test statistic T while cumulating the received local test statistic $Y_k$ in step S104.

Whenever receiving local test statistic, a comparison operation of the cumulated total test statistic T with a threshold λ, is carried out in step S105.

If the total test statistic is below a threshold T<λ, then transmission is maintained in step S106, and feedback is carried out to step S102 previously described. However, if the total test statistic is greater than a threshold T>λ, it is determined that there is a primary user in step S107.

As such, an experiment through computer simulation has been carried out to check whether a method suggested in a second embodiment of the invention actually leads to performance enhancement. In order to make an actual experimental environment, an experimental environment under IEEE 802.22 has been considered. A detection probability must be 90% or greater in common for spectrum sensing, and a false alarm probability must be lower than 10%. In addition, there is a condition that a detection time must be 2 seconds or shorter, and the shorter the detection time is, the more a primary user may be protected. Meanwhile, since the SNR condition of a receiver must satisfy 1 dB in case of an analogue TV, −21 dB in case of a digital TV, and −12 dB in case of an RF microphone, energy detection must well be carried out even at a low SNR. Thus, SNR is assumed to be −15 dB in experiment. In experiment, the average on the results of a total of about 100,000 times is found.

Figure 9:
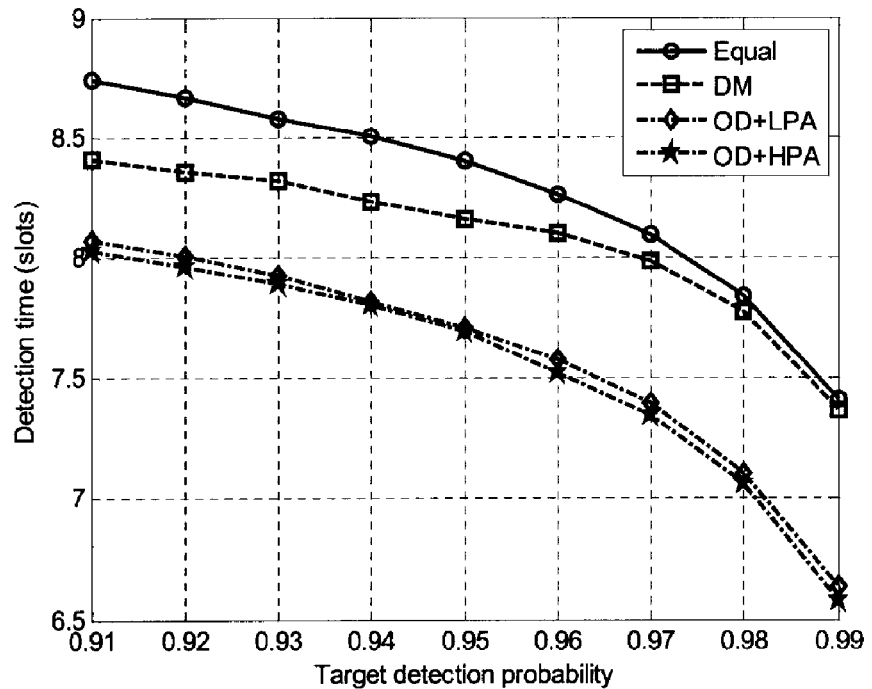
FIG. 9 is a graph depicting the detection time by a method suggested in a second embodiment while changing a target detection probability in an IID environment where the average SNRs of all the sensing nodes are the same.

FIG. 9 is a graph depicting the detection time by a method suggested in a second embodiment while changing a target detection probability in an IID environment where the average SNRs of all the sensing nodes are the same.

The number of sensing nodes has been assumed to be K=5, and a sensing window size used for energy detection for each sensing node has been considered to be N=5.

In addition, a result by a method according to a first embodiment has also been depicted for comparison. In the graph, 'Equal' means that all the sensing nodes transmit at the same transmission probability according to a method according to a first embodiment, and 'OD' means determining and transmitting a transmission probability according to order detection based on the energy detected from an individual sensing node that is a scheme suggested in a second embodiment. In addition, the method according to the second embodiment has been divided into an 'LPA' scheme allocating in proportion to an order and an 'HPA' scheme allocating according to harmonic progression.

Looking into the result, it may be recognized that both schemes suggested in the second embodiment reduce a detection time in a given environment more than the scheme by the first embodiment. At a level that a detection probability is 95%, 'OD+HPA' may represent the decrease of 9.03% in detection time. At a level that a detection probability is 99%, 'OD+HPA' may represent the decrease of 11.46% in detection time. In addition, it may be recognized in common that as a target detection probability increases, a detection time decreases. The reason is that if the target detection probability increases, a threshold also becomes low for this and it is only needed to add a small number of test statistics. Meanwhile, in case of DM, it may be recognized that a detection time becomes shorter than in case of 'Equal' but longer than in cases of 'OD+LPA' and 'OD+HPA'.

Figure 10:
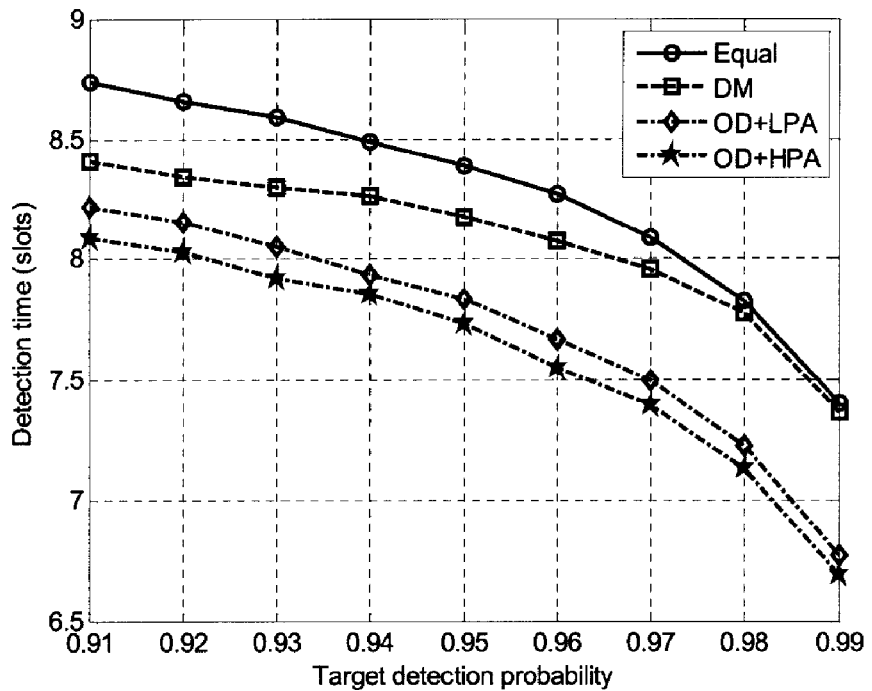
FIG. 10 is a graph depicting the detection time by a method according to a second embodiment while changing a target detection probability in an INID environment where the average SNRs of individual sensing nodes are different from one another.

FIG. 10 is a graph depicting the detection time by a method according to a second embodiment while changing a target detection probability in an INID environment where the average SNRs of individual sensing nodes are different from one another.

As in case of IID illustrated in FIG. 9, it has been assumed that K=5 and N=5, and the uniform distribution of [−25, −5] been assumed to give rise to a change in the SNR of a sensing node. The overall trend of a detection time is similar to the case of IID. Particularly in cases of 'Equal' and 'DM', if repeated times increase, the same detection time to the case IID may be obtained on average even if average SNRs are different from one another. However, when order detection is applied, a different result from the case of IID may be obtained but it is verified that there is performance enhancement on 'Equal' and 'DM'. However, it may be recognized that performance enhancement gain decrease compared to IID.

Since the method according to the second embodiment described above has a fixed threshold (FT) for a target detection probability, it is determined that a signal has been detected only if the test statistic transmitted from an individual sensing node is cumulated and exceeds the corresponding threshold.

However, another embodiment of the invention may make a variation so that each time each test statistic is cumulated, a threshold is correspondingly adjusted, as the number of samples increases according to the number of samples collected at the corresponding time, a cumulated test statistic value becomes large, and the threshold also becomes large correspondingly. In order words, if the number of the cumulated samples is $k_{Count}$ among the overall sensing nodes K, Equation 6 for finding a threshold may be replaced with the following Equation 22.

$$\lambda = (\sigma_h^2 + \sigma_w^2)(k_{Count}N + \sqrt{k_{Count}N}Q^{-1}(P_D^t)) \qquad \text{<Equation 22>}$$

If the threshold of Equation 22 is used, a smaller threshold is obtained compared to a threshold considering the overall node since a threshold for the overall sensing node is not taken but a normalized threshold (NT) satisfying a given target detection probability by considering the number of samples received each time is calculated. Thus, an average detection time becomes shorter. A graph illustrating the relation of a detection time vs. a target detection probability using such a result is represented in FIG. 11.

Figure 11:
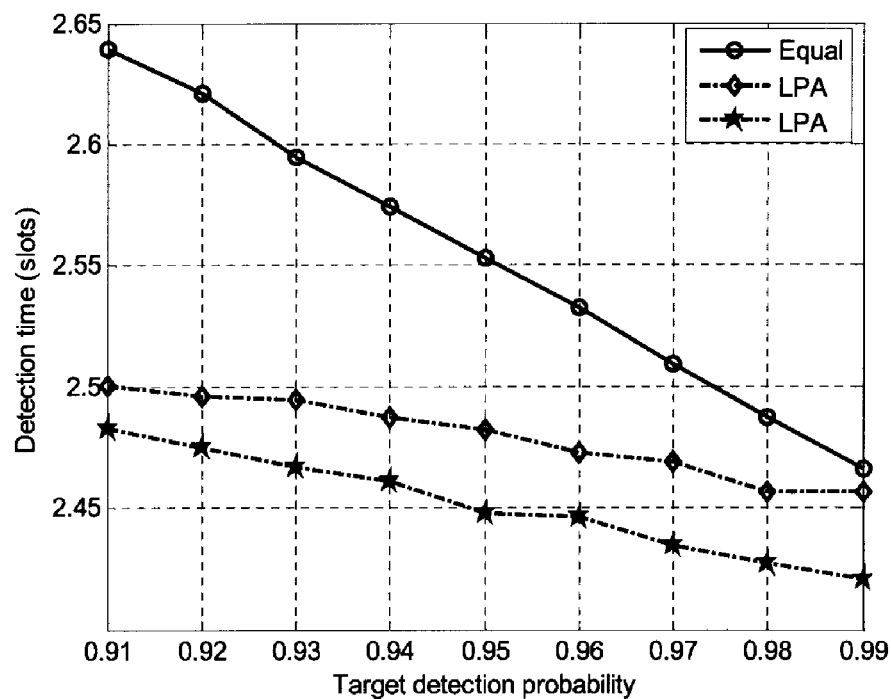
FIG. 11 is a graph illustrating a detection time depending on the change of a target diction probability in case of applying a normalized threshold according to a third embodiment of the invention.

FIG. 11 is a graph illustrating a detection time depending on the change of a target diction probability in case of applying a normalized threshold according to a third embodiment of the invention.

In an experiment of FIG. 11, the same experimental environment to FIG. 9 has been assumed and only whether to normalize a threshold has been set differently. Viewing FIG. 11, it may be recognized that using a normalized threshold for cases of 'Equal', applying 'LPA' and 'HPA' may arise a shorter detection time compared to when it is not used. The reason is that since when the number of samples is small, a threshold correspondingly becomes small. As a result, a threshold is easily exceeded for a small number of samples.

A detection time decreases on average compared to when using a fixed threshold applying a normalized threshold. However, since a threshold is set to be small to satisfy a target detection probability in a state of lacking the number of samples initially, an increase in a false alarm probability due to this may be expected.

Figure 12:
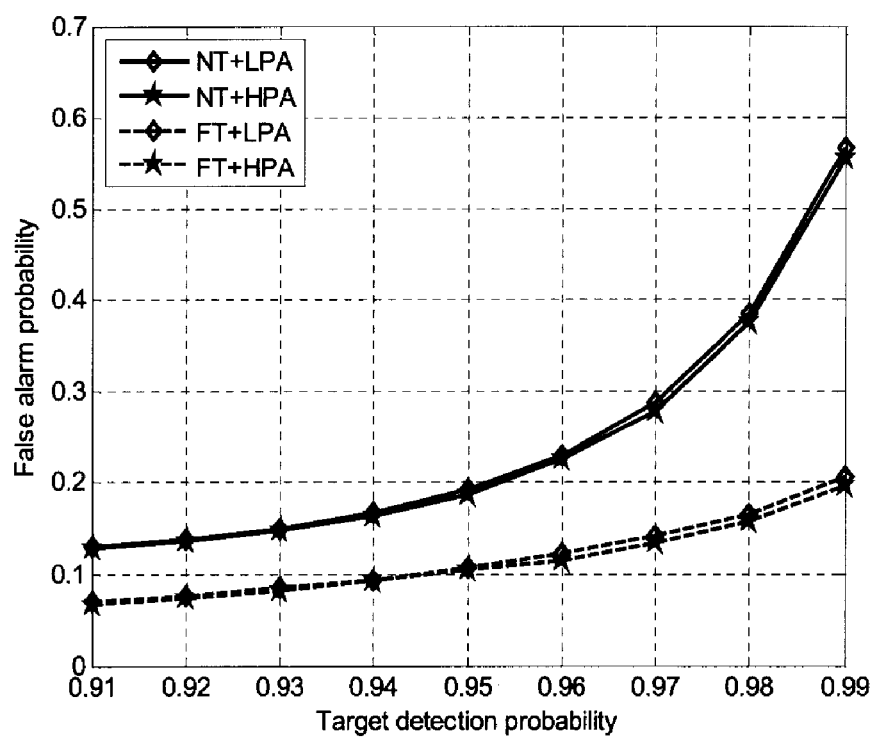
FIG. 12 is a graph illustrating a detection time depending on the changes of a target diction probability of a false alarm probability in cases of applying a normalized threshold and a fixed threshold according to a third embodiment of the invention.

FIG. 12 is a graph illustrating a detection time depending on the changes of a target diction probability of a false alarm probability in cases of applying a normalized threshold and a fixed threshold according to a third embodiment of the invention.

Viewing the graph, it may be recognized that a false alarm probability becomes greater when a normalized threshold is used (NT) than when a fixed threshold is used (FT). It may be recognized that if the normalized threshold is used, quick detection is carried out due to a small threshold as in FIG. 12 and a detection time becomes shorter, but a false alarm probability also becomes greater simultaneously due to this.

The method according to the invention described so far may be implemented software, hardware, or their combination. For example, the method according to the invention may be stored in storage media (e.g. an internal memory, a flash memory, a hard disc, etc.), and may be implemented as codes or commands in a software program capable of being executed by a processor (e.g. a micro processor). Regarding this, a description is made with reference to FIG. 13.

Figure 13:
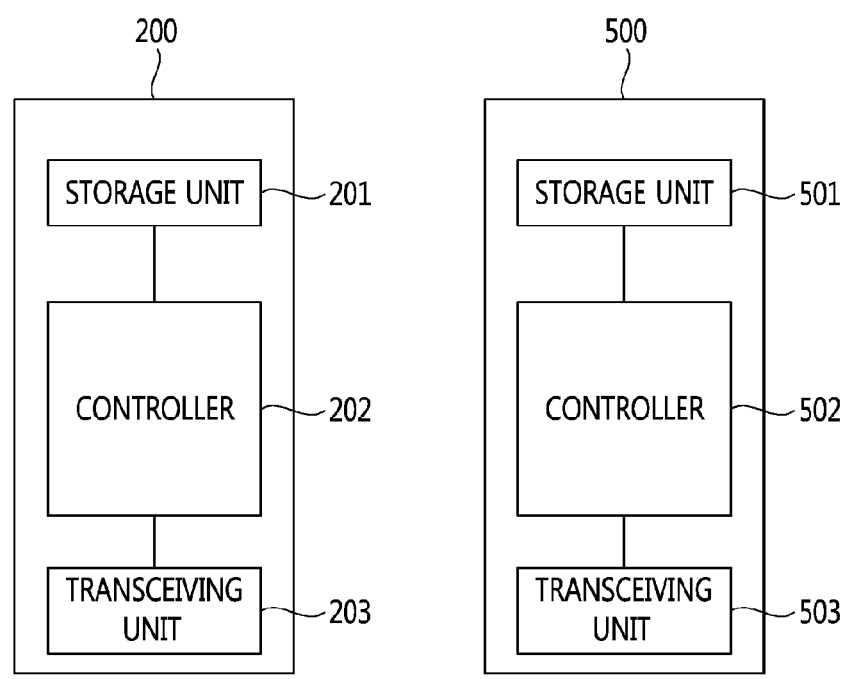
FIG. 13 is a block diagram illustrating a configuration of a sensing node 200 and a fusion center 500 according to the invention.

FIG. 13 is a block diagram illustrating a configuration of a sensing node 200 and a fusion center 500 according to the invention.

As illustrated in FIG. 13, the sensing node 200 includes a storage unit 201, a controller 202, and a transceiving unit 203. In addition, the fusion center 520 includes a storage unit 501, a controller 502, and a transceiving unit 503.

The storage units 201, 501 store methods illustrated in FIGS. 2 to 12.

The controllers 202 and 502 control the storage units 201 and 501, and the transceiving units 203 and 503. In particular, the controllers 202 and 502 each executes the methods stored in the storage units 201 and 501. In addition, the controllers 202 and 502 transmit the signals described above through the transceiving units 203 and 503.

Although exemplary embodiments of the invention have been described as examples above, the scope of the invention is not limited to such specific embodiments. Therefore, the invention may be modified, changed or improved in various forms within the spirit of the invention and the scope disclosed in claims.

The invention claimed is:

1. A method for performing spectrum sensing to detect a signal for a terminal of a primary user in each sensing node, the method comprising:
    performing, by the sensing node, spectrum sensing to detect a signal for a terminal of a primary user;
    computing, by the sensing node, a local test statistic value on the basis of the result of the spectrum sensing;
    calculating, by the sensing node, a transmission probability on the basis of the computed local test statistic value, wherein the calculating the transmission probability includes performing order detection detecting how greatest its local test statistic value is among statistic values by other sensing nodes in size, and determining the transmission probability according to the result of the order detection; and
    transmitting, by the sensing node, sensing information to a fusion center on the basis of the calculated transmission probability,
    wherein it is determined whether there is a signal for a terminal of a primary user on the basis of the transmitted sensing information at the fusion center.

2. The method of claim 1, wherein the sensing information includes the local test statistic value.

3. The method of claim 2, wherein the local test statistic value includes the energy value of the primary user received from the sensing node.

4. The method of claim 1, wherein the greater the local test statistic value is, the greater the transmission probability becomes, and the smaller the local test statistic value is, the less the transmission probability becomes.

5. The method of claim 1, wherein the transmission probability is determined to be harmonically proportional to the ascending order of the detected order.

6. The method of claim 5, wherein the sum of the transmission probability determined by the sensing node and the transmission probabilities determined by other sensing nodes are 1.

7. The method of claim 1, wherein the transmission probability is determined on the basis of the probability of a size of the local test statistic value by a cumulative distribution function of a Gaussian distribution.

8. A sensing apparatus for performing spectrum sensing to detect a signal for a terminal of a primary user, the apparatus comprising:
    a transceiving unit configured to perform spectrum sensing to detect a signal for a terminal of a primary user by a sensing node; and a processor configured to compute a local test statistic value on the basis of the result of the spectrum sensing, calculate a transmission probability on the basis of the computed local test statistic value, and transmit sensing information to a fusion center on the basis of the calculated transmission probability by the sensing node, wherein the transmitted sensing information is used to determine whether there is a signal for a terminal of a primary user at the fusion center, and wherein the processor calculates the transmission probability by performing order detection detecting how greatest its local test statistic value is among statistic values by other sensing nodes in size, and determining the transmission probability according to the result of the order detection.

9. The apparatus of claim 8, wherein the sensing information includes the local test statistic value.

10. The apparatus of claim 9, wherein the local test statistic value includes the energy value of the primary user received from the sensing node.

* * * * *